(12) United States Patent
Kaneshige et al.

(10) Patent No.: US 7,397,751 B2
(45) Date of Patent: Jul. 8, 2008

(54) OPTICAL DISK APPARATUS, METHOD OF RECORDING INFORMATION, AND INFORMATION RECORDING MEDIUM

(75) Inventors: Toshihiko Kaneshige, Yokohama (JP); Koichi Otake, Yokohama (JP); Hideyuki Yamakawa, Kawasaki (JP); Yukiyasu Tatsuzawa, Yokohama (JP); Hiroyuki Moro, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 727 days.

(21) Appl. No.: 11/017,703

(22) Filed: Dec. 22, 2004

(65) Prior Publication Data

US 2005/0141373 A1    Jun. 30, 2005

(30) Foreign Application Priority Data

Dec. 25, 2003   (JP)   ............................. 2003-431032

(51) Int. Cl.
*G11B 7/00* (2006.01)

(52) U.S. Cl. ............... 369/59.24; 369/59.23; 369/59.26

(58) Field of Classification Search ...................... None
See application file for complete search history.

(56) References Cited

U.S. PATENT DOCUMENTS 6,172,947 B1   1/2001   Senshu 6,813,230 B1 *  11/2004   Ko et al. ..................... 369/47.1

FOREIGN PATENT DOCUMENTS

| EP | 1 098 301 A2 | 5/2001 |
|----|---|---|
| JP | 2002-32962 | 1/2002 |
| JP | 2003-59050 | 2/2003 |

OTHER PUBLICATIONS

European Search Report dated May 9, 2005 for Appln. No. EP 04 02 9081.

* cited by examiner

*Primary Examiner*—William Korzuch
*Assistant Examiner*—Joseph Haley
(74) *Attorney, Agent, or Firm*—Pillsbury Winthrop Shaw Pittman, LLP

(57) ABSTRACT

A recorded stream generator generates a data block stream in synchronism with the phase of a recording clock, from the input data. The recorded stream generator further generates, for each predetermined data unit constituting the data block stream, a data phase reference pulse indicative of the phase of the data unit. An inserting section inserts a VFO signal into a predetermined amount (32 sectors) of the data block stream, the VFO signal having a length of time corresponding to a difference in phase between an wobble address phase signal and a data phase reference pulse. The inserting section thus provides a data stream DST consisting of the VFO signals and the data block streams. An LD uses light beams to record the data stream on an optical disk.

9 Claims, 11 Drawing Sheets

Frequency modulation

Phase modulation

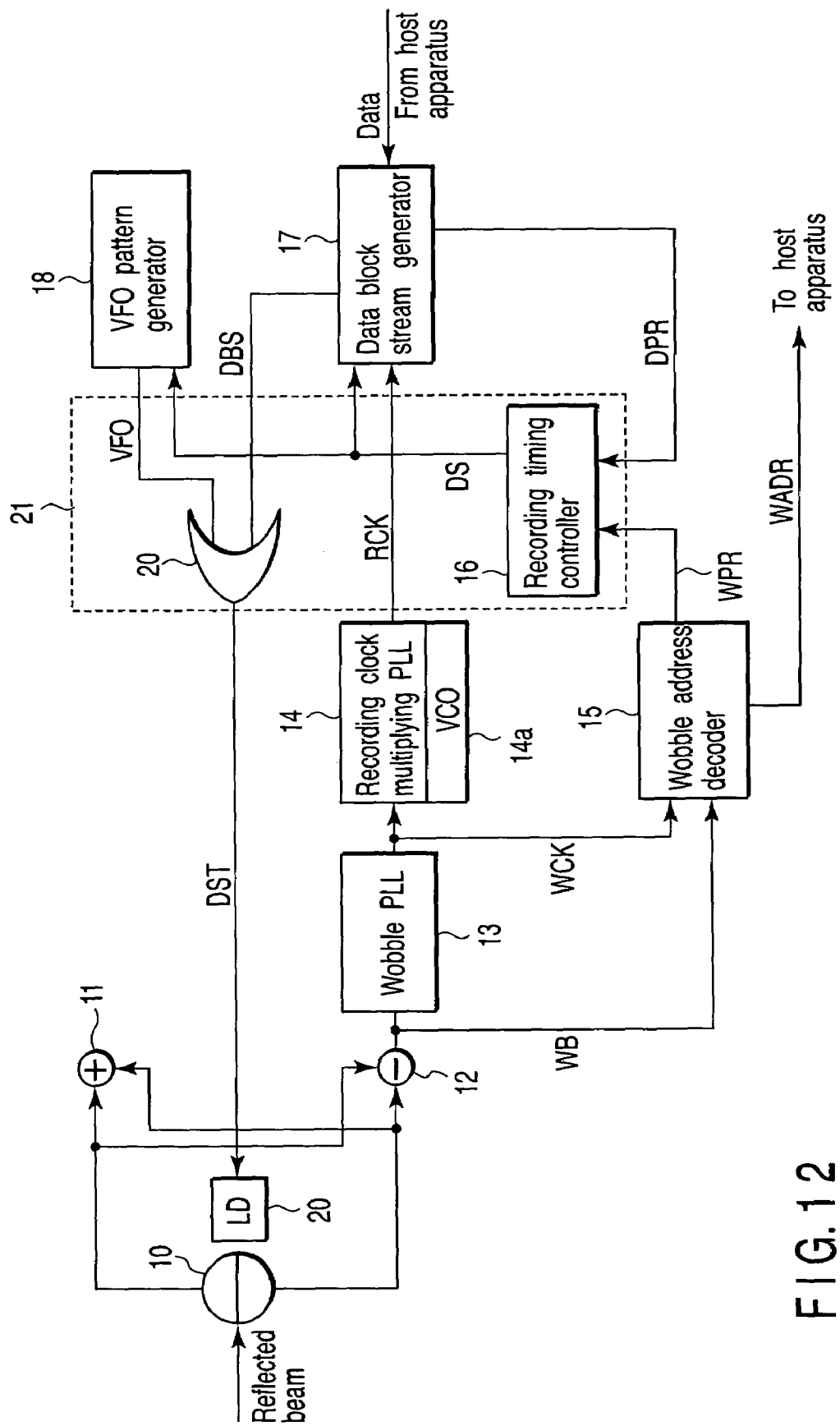
F I G. 12

US 7,397,751 B2

OPTICAL DISK APPARATUS, METHOD OF RECORDING INFORMATION, AND INFORMATION RECORDING MEDIUM

CROSS-REFERENCE TO RELATED APPLICATIONS

This application is based upon and claims the benefit of priority from prior Japanese Patent Application No. 2003-431032, filed Dec. 25, 2003, the entire contents of which are incorporated herein by reference.

BACKGROUND OF THE INVENTION

1. Field of the Invention

The present invention relates to an optical disk on which address information is recorded as wobbles of a recording track, an optical disk apparatus that records and reproduces information on and from the optical disk, and a method of recording information.

2. Description of the Related Art

DVD-RAMs and DVD RWs are known as rewritable optical disks. These optical disks have an information recording layer formed on a transparent substrate. Laser light is condensed on the information recording layer to record and reproduce information. Further, as means for recording and reproducing information, the information recording layer of the optical disk has a guide groove often simply called a groove. Information is recorded and reproduced along the guide groove. Furthermore, physical addresses are formed along the guide groove to identify spatial positions at which recording or reproduction of information is carried out.

In a DVD-RAM, a technique called land and groove recording is used as means for increasing density. In the DVD-RAM, information is recorded both on a groove, which is a concave portion of the guide groove, and on a land, which is a convex portion of the guide groove. This serves to reduce the intervals at which data is recorded in a radial direction, to increase a recording capacity. On the other hand, the physical addresses are formed of intermittent concaves and convexes on the substrate called prepits. The guide groove is discontinued in these physical address areas.

In contrast, in a DVD-RW, information is recorded only on the groove, which is the concave portion of the guide groove. On the other hand, as means for forming physical addresses, modulation of groove wobbles (hereinafter referred to as "wobble modulation") is used in which the guide groove is slightly vibrated in the radial direction. The physical addresses formed using the wobble modulation do not block a recording track (guide groove). Accordingly, these physical addresses have the advantages of increasing an area in which user information is recorded, that is, improving a format efficiency, and making the optical disk easily compatible with reproduction-exclusive media.

Thus, for an optical disk apparatus that records information on an optical disk having address information based on the wobble modulation, it is necessary to synchronize the phase of a wobble address with the phase of data to be recorded in a sector or the like during information recording. However, there may be a difference in phase between the wobble address and the data to be recorded for some reason. When data is recorded on the optical disk while there remains a phase difference, it may be difficult to reproduce the recorded data. Jpn. Pat. Appln. KOKAI Publication No. 2002-32962 describes a technique for varying the frequency of a recording clock depending on the phase difference.

With this patent document, if there is a difference in phase between a recorded stream and the wobble address, the recording clock frequency is controlled to remove the phase difference. Thus, disadvantageously, jitter may occur in the recording clock, which degrades recording signals.

BRIEF SUMMARY OF THE INVENTION

An optical disk apparatus according to an embodiment of the present invention comprises: a wobble signal generating section which generates a wobble signal from reflected light from a track in an optical disk on which wobbles modulated by address information are formed; recording clock generating section which multiplies a frequency of the wobble signal to generate a recording clock for information recording; an address phase generating section which generates an address phase signal indicative of a phase of each wobble address, from the wobble signal; a VFO (Variable Frequency Oscillator) signal generating section which generates a VFO signal by dividing a frequency of the recording clock (RCK); a recorded stream generating section which generates a first data stream in synchronism with the phase of the recording clock, from input data and generates, for each predetermined data unit constituting the first data stream, a data phase signal indicative of a phase of the data unit; an inserting section which measures a difference in phase between the address phase signal and the data phase signal, and inserts the VFO signal between predetermined amount of the first data streams, to provide a second data stream consisting of the VFO signals and the first data streams, the VFO signal having a length of time corresponding to the difference in phase; and a recording section which records the second data stream on the optical disk.

The adjustment of an error in recording phase serves to provide an optical disk apparatus that can regulate an error in phase to control the phase of data to be recorded without causing jitter in the recording clock.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 12 is a diagram showing an example of the configuration of an essential part of an optical disk apparatus according to a second embodiment of the present invention.

DETAILED DESCRIPTION OF THE INVENTION

Embodiments of the present invention will be described below in detail with reference to the drawings.

Figure 1:
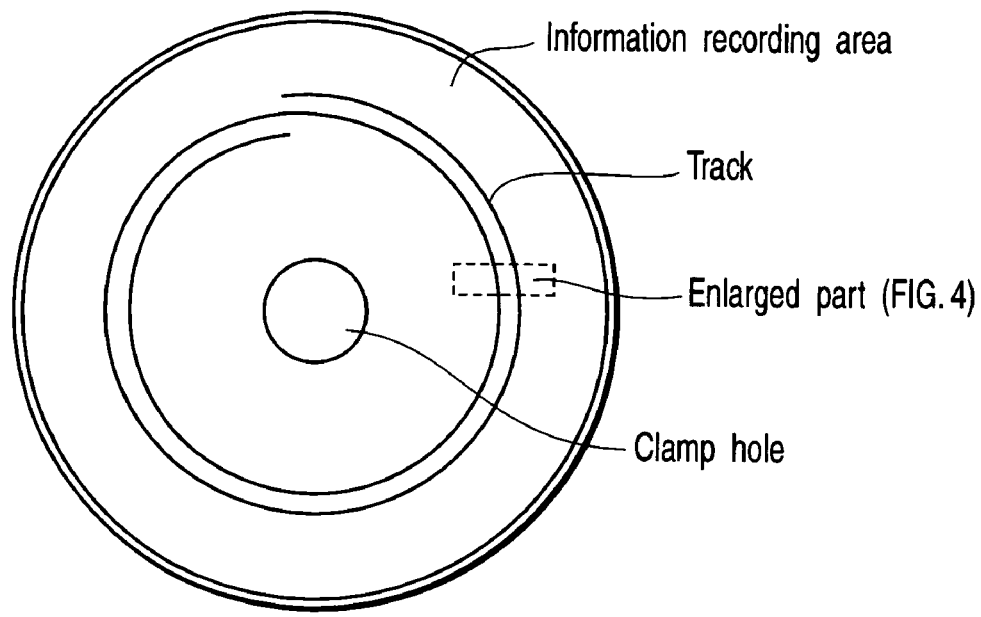
FIG. 1 is a diagram showing the configuration of a track formed on an optical disk.

An optical disk on which user information can be recorded has a guide groove in an information area in an information recording layer on a transparent substrate; the guide groove is often simply referred to as a groove. The guide groove is called a track. Information is recorded and reproduced along the track. In some cases, the track is of a spiral type that extends continuously from inside to outside as shown in FIG. 1. In other cases, the track is of a concentric type formed of a plurality of concentric circles (not shown).

Figure 2:
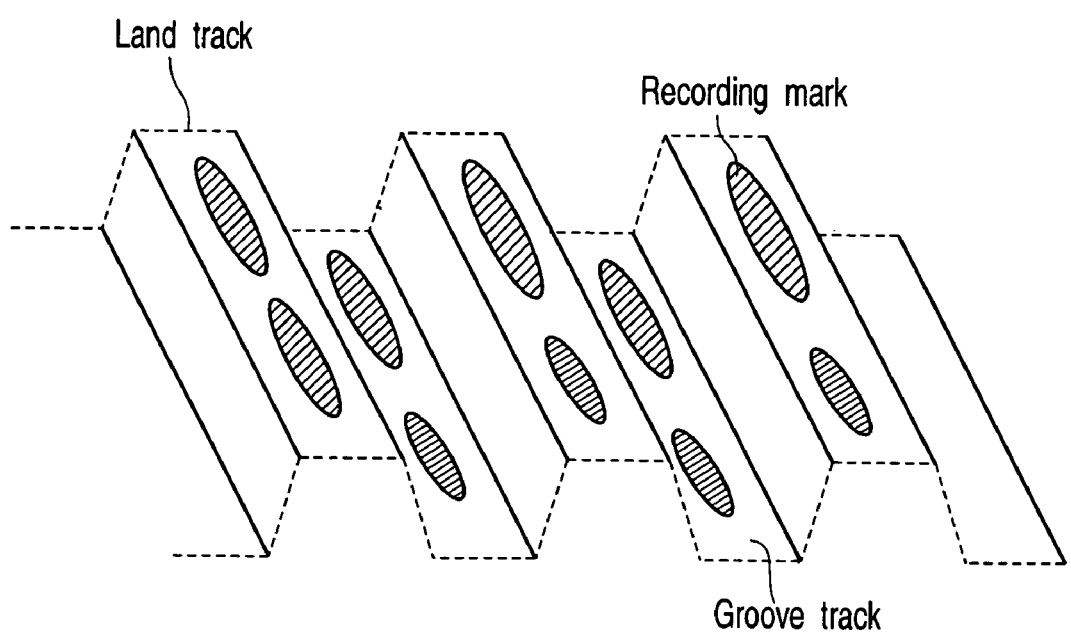
FIG. 2 is an enlarged diagram of the track formed on the optical disk.

FIG. 2 is an enlarged diagram of the track. The track is formed of concaves and convexes of the information recording layer. The concave of the track is called a groove, while the convex of the track is called a land. For example, in the DVD-RAMs or next-generation recordable optical disks, information is formed both on the lands and grooves to increase density in a radial direction.

Figure 3A:
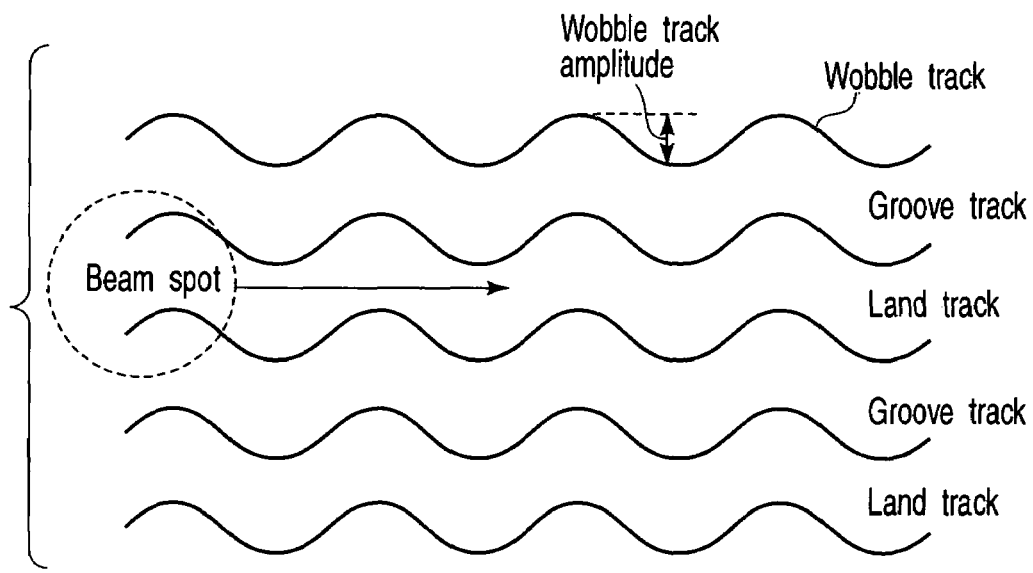
FIGS. 3A through 3C are an enlarged diagram of the track as viewed from above and graphs showing a sum signal and a difference signal for reproduced signals.

FIG. 3A is a diagram of the track as viewed from above. The track in the optical disk according to the present invention meanders slightly in the radial direction. Such a track is called a wobble track. As a focused beam spot is scanned along the wobble track, the beam spot travels almost straight through the center of the wobble track. This is because a wobble frequency is higher than the band of a tracking servo signal. At this time, reflected light is received by a photo sensor such as a PD (Photo Diode) 15 shown in FIG. 7, described later; the photo sensor is divided into two pieces in the radial direction. Thus, sensing signals obtained from two photo sensing elements are used to generate a sum signal and a difference signal.

Figure 3B:
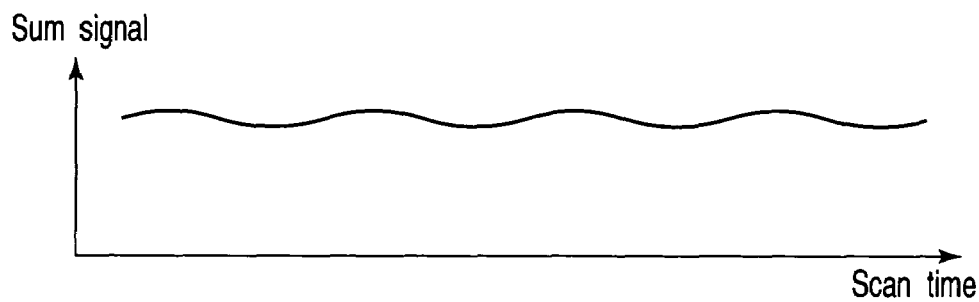
Figure 3C:
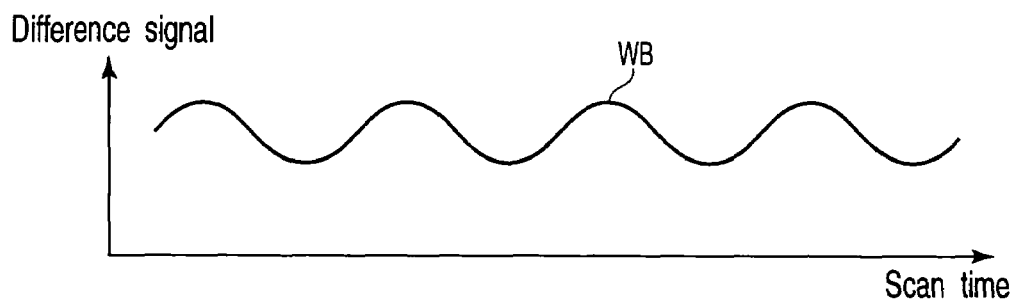

The sum signal remains almost unvaried as shown in FIG. 3B, and only the difference signal varies in accordance with the wobble. In this manner, for the recordable optical disk, the difference signal reflects the wobble of the track. Accordingly, the difference signal is called a wobble signal WB in the specification. The wobble signal is utilized as a reference for a recording clock or an adjustment signal for the rotation frequency of a spindle.

Figure 4A:
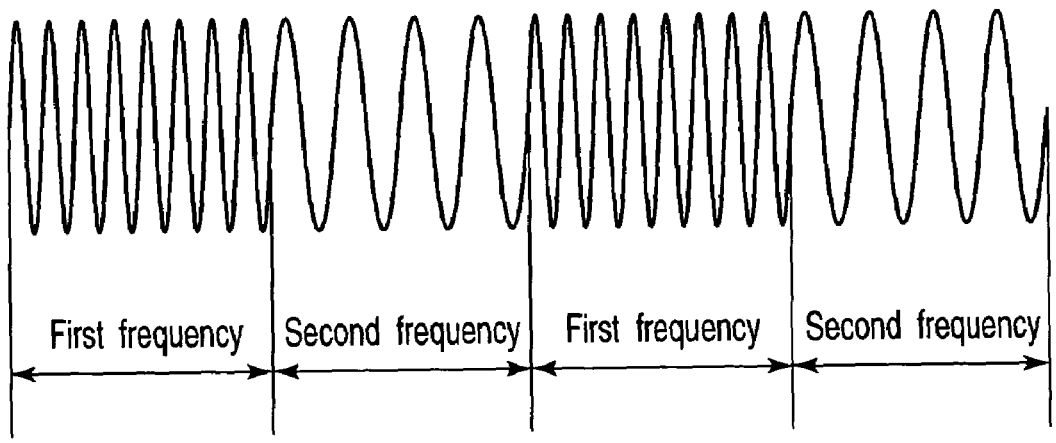
FIGS. 4A and 4B are diagrams showing frequency and phase modulated wobbles.
Figure 4B:
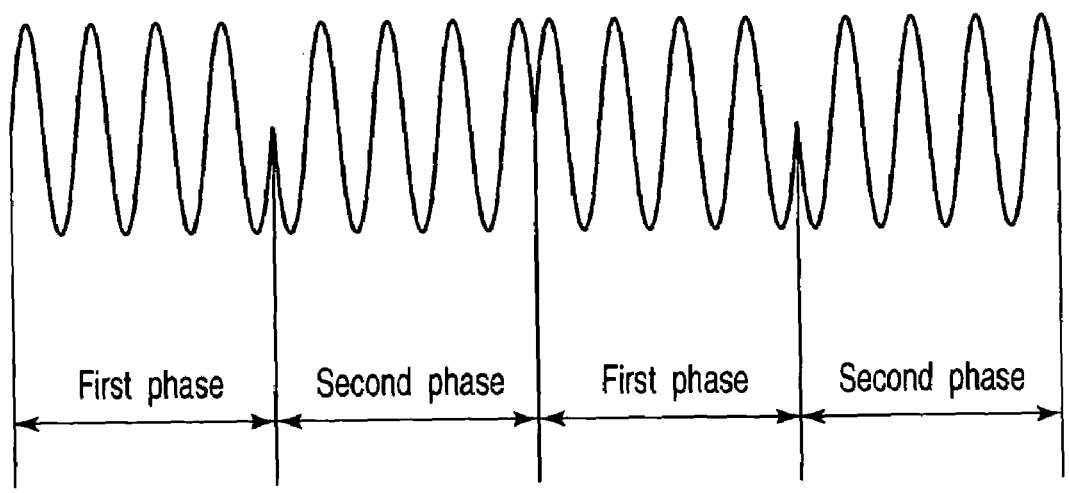

Moreover, with the recordable optical disk, modulation of the wobble enables the recording of physical address information indicative of a physical position in the information recording area of the optical disk. Specifically, physical address information is recorded by modulating the frequency or phase of the wobble applied to the track as shown in FIGS. 4A and 4B. The signals shown in FIGS. 4A and 4B both show, for example, "1", "0", "1", and "0". Processing of the wobble signal WB enables the extraction of physical address information indicative of a position on the optical disk which is irradiated with a laser beam.

Figure 5:
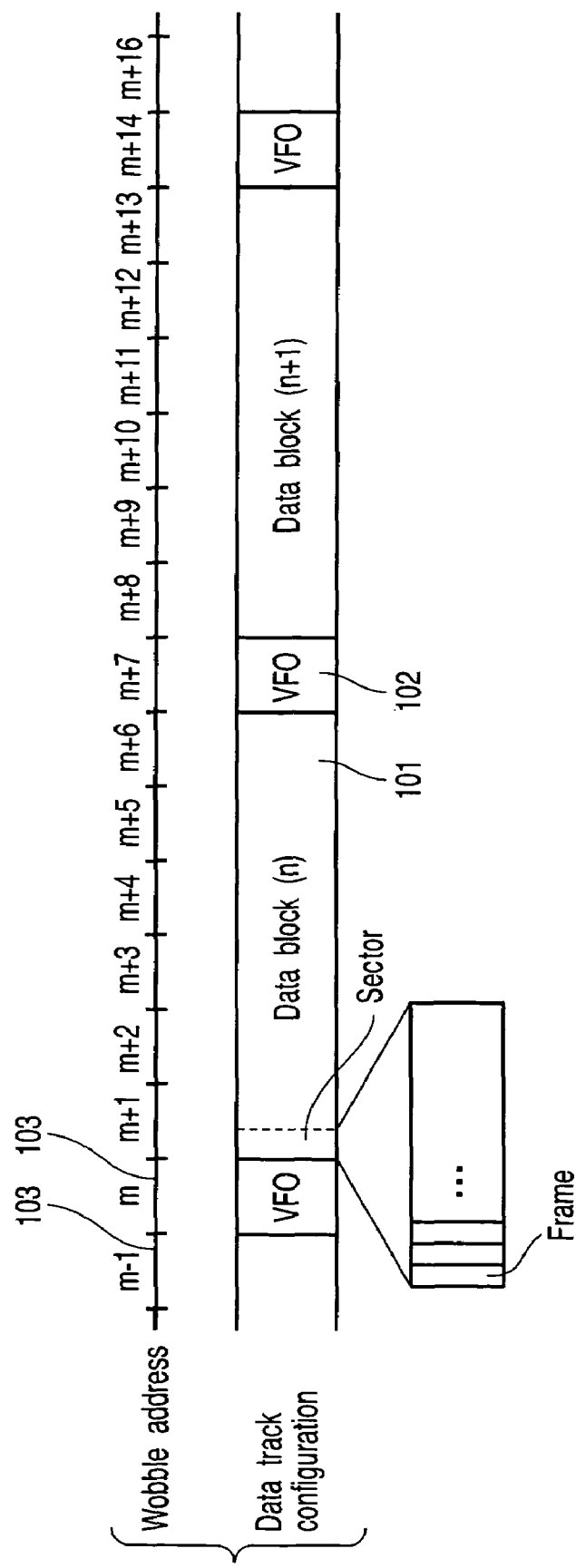
FIG. 5 is a diagram schematically showing the relationship between the configuration of the data track and wobble addresses.

FIG. 5 is a diagram schematically showing the relationship between the configuration of the data track and wobble addresses.

Data to be recorded is divided into data blocks 101, each of a predetermined data length. The data track on the disk is constructed by inserting VFO (Variable Frequency Oscillator) signals 102 of a predetermined length between the data blocks. When the period of the recording clock during information recording or reproduction is defined as T, the VFO signal is, for example, a continuous clock signal of a period 4T and indicates the start and end of each recording block 101. The VFO signal is also used to assist synchronous lead-in in a PLL circuit that generates a clock synchronizing with reproduced data during reproduction. Each data block 101 is composed of, for example, 32 sectors each having, for example, 2-kilobyte data and composed of, for example, 26 frames. The recording track is composed of the wobble track on which wobble addresses indicative of track positions are recorded in an overlapping manner.

Figure 6:
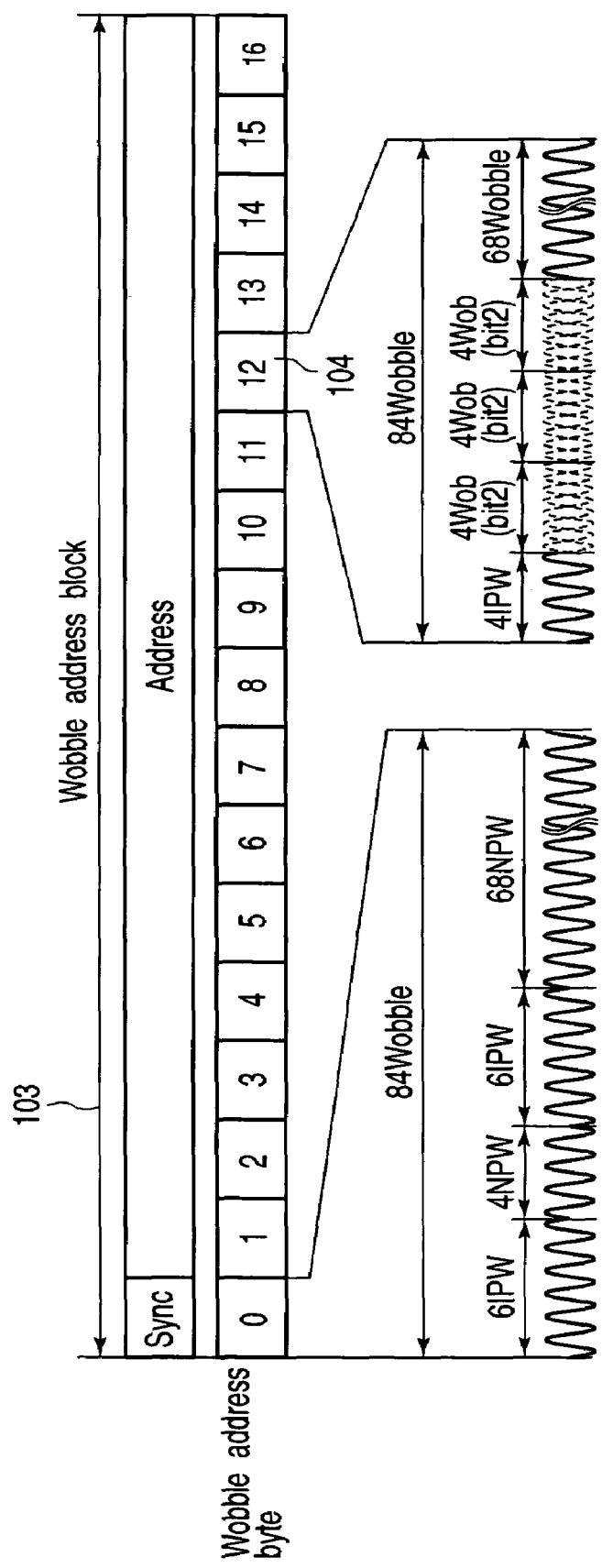
FIG. 6 is a diagram showing the configuration of each wobble address block 103.

FIG. 6 is a diagram showing the configuration of a wobble address block (=wobble address area) 103.

Each wobble address block 103 shown by a wobble address WADR (m−1, m, m+1, . . . ) shown in FIG. 5 is configured as shown in FIG. 6. One wobble address block 103 constitute one wobble block address. The wobble address block 103 is composed of one wobble address block synchronous byte Sync and 16 wobble address byte 104. The wobble address block synchronous byte Sync and the 16 wobble address bytes 104 are each composed of 84 wobbles. Accordingly, the wobble address block 103 has 1,428 wobbles.

IPM denotes a non-modulated wobble signal, NPW denotes a modulated wobble signal. The adjacent IPW and NPW have inverse polarities. The wobble address block synchronous byte Sync is composed of 6 IPWs, 4 NPWs, 6 IPWs, and 68 NPWs. One bit is recorded by four wobbles. The NPW indicates "0", and the IPW indicates "1". Three-bit information (the waveform shown by a dotted line in FIG. 6) is recorded in the wobble address byte 104. Forty-eight bits (=3 bits×16 bytes) constitutes one wobble address.

Data must be recorded in phase synchronism with the wobble address. If the data block 101 is divided into the above sectors and frames, the sectors and frames must be recorded in phase synchronism with the wobble address WADR.

Figure 7:
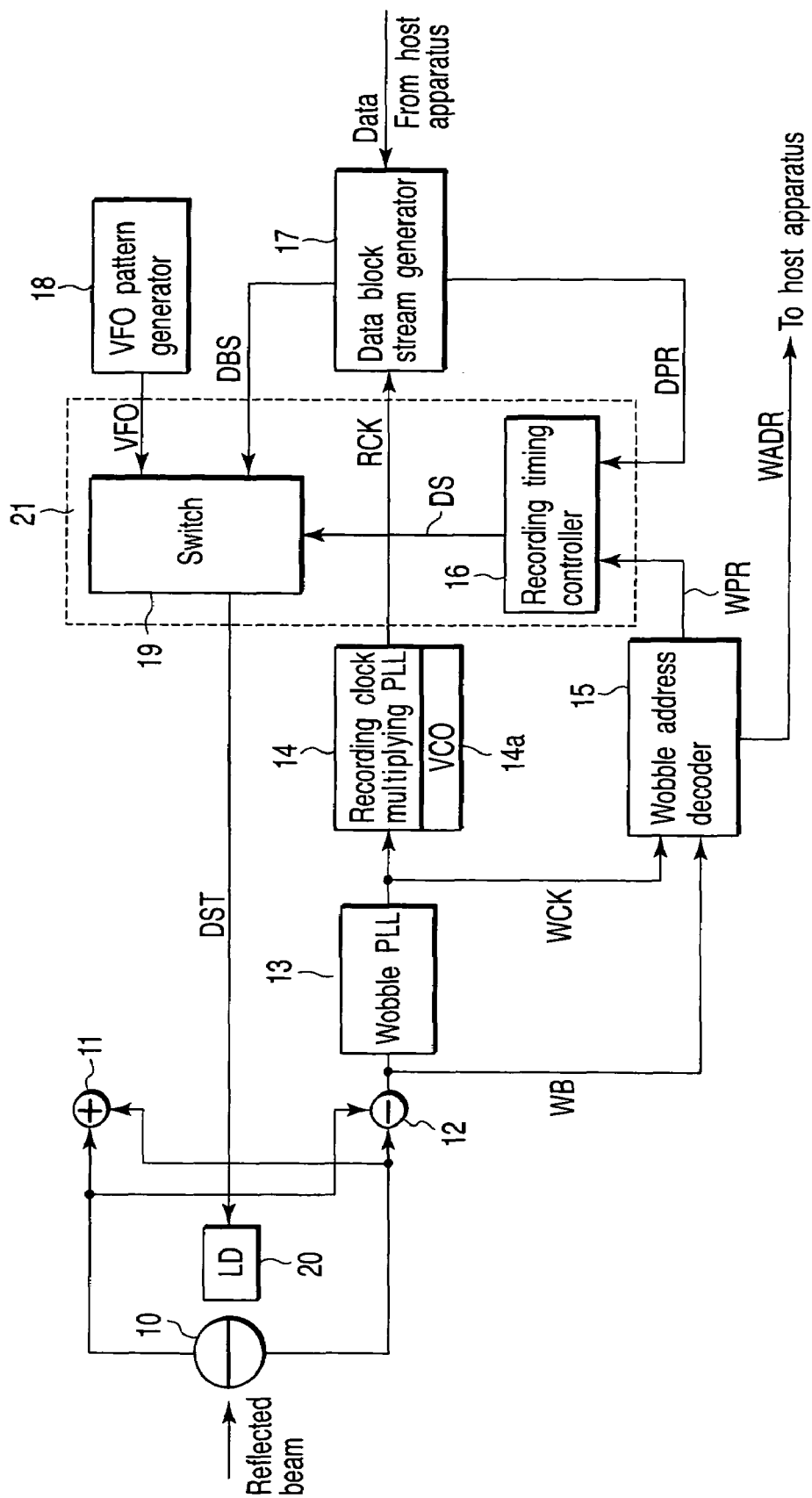
FIG. 7 is a diagram showing an example of the configuration of an essential part of an optical disk apparatus according to a first embodiment of the present invention.
Figure 8:
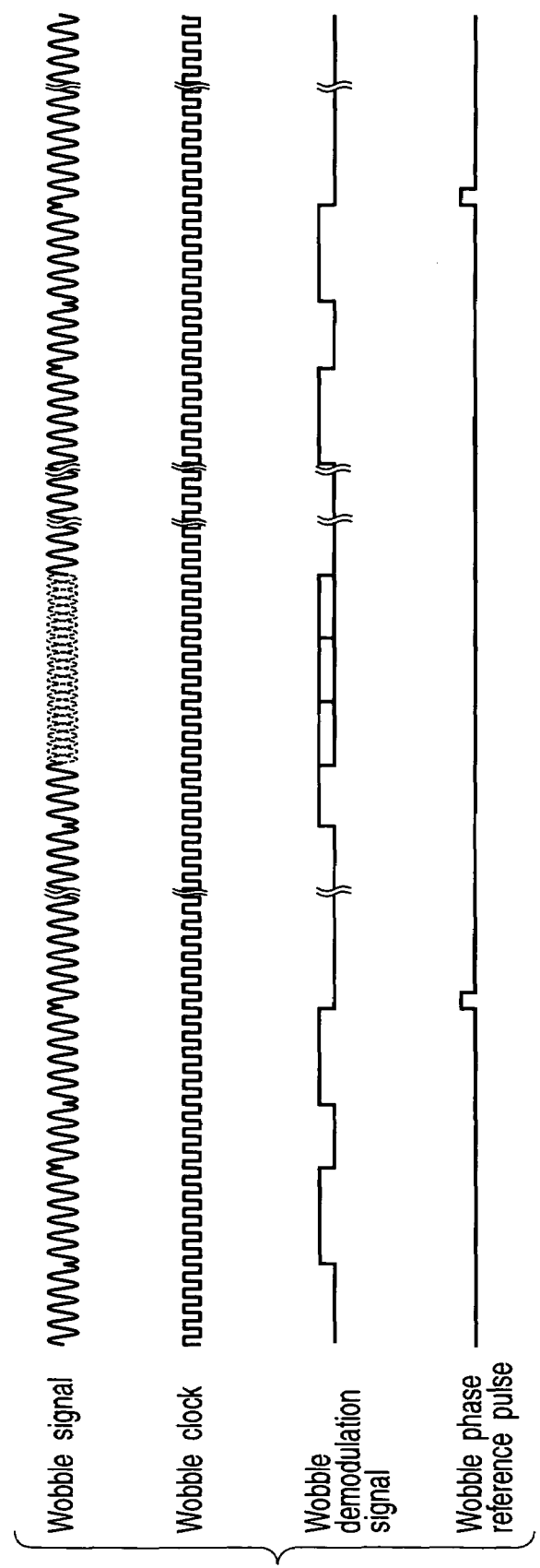
FIG. 8 is a diagram showing the waveforms of inputs to and outputs from a wobble address decoder 15.
Figure 9:
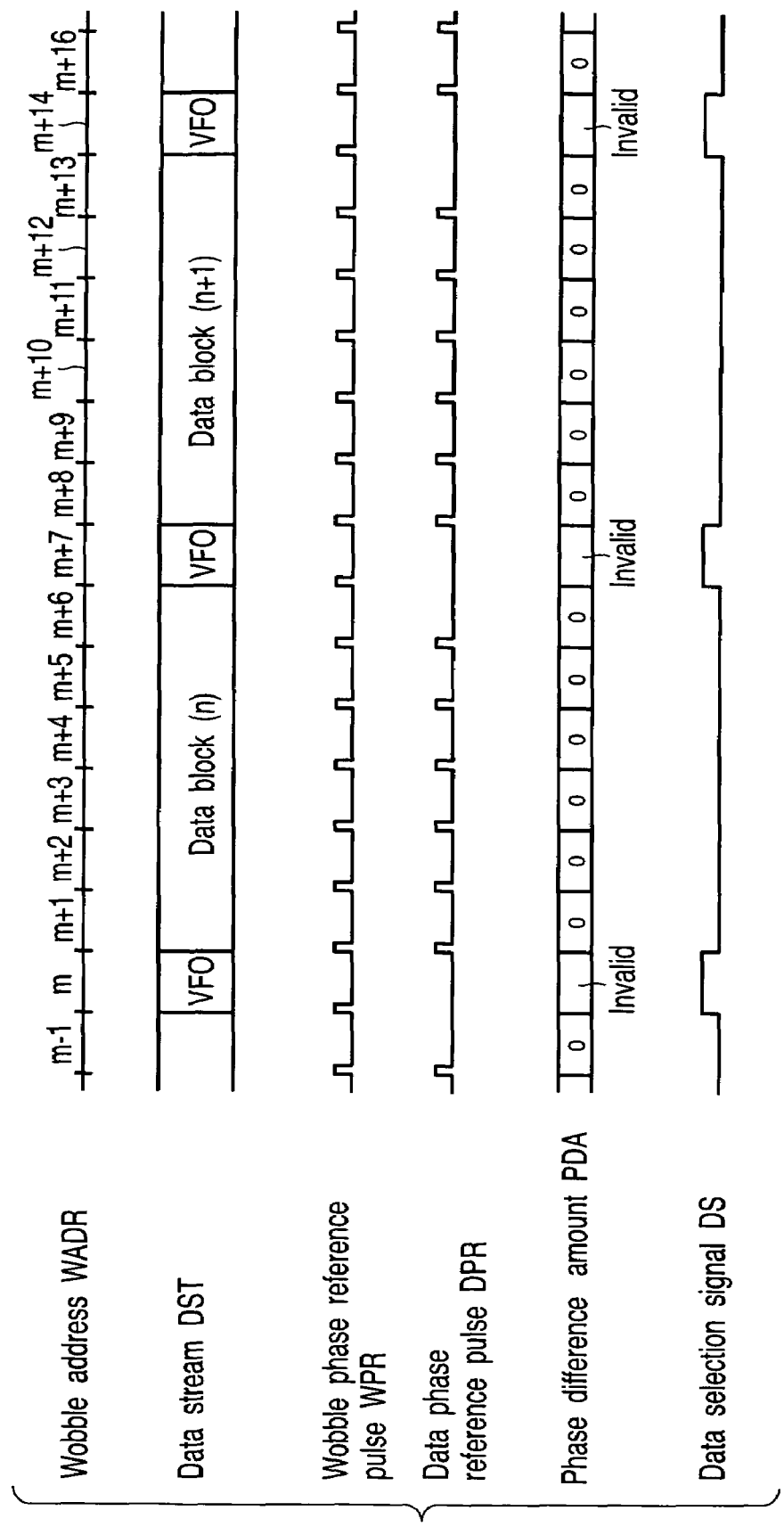
FIG. 9 is a timing chart showing operations of an information recording apparatus shown in FIG. 7.

FIG. 7 is a diagram showing an example of the configuration of the optical disk apparatus serving as an information recording apparatus according to the present embodiment. FIGS. 8 and 9 are timing charts showing operations of the information recording apparatus shown in FIG. 7.

As previously described, an adder 11 adds together two sensing signals provided by the photo sensing elements constituting the respective half surfaces of the PD 10, to generate a reproduced stream signal. A subtractor 12 subtracts the smaller sensing signal from the larger sensing signal to generate a wobble signal WB. The wobble signal WB is input to a wobble PLL 13 and the wobble address decoder 15. The wobble PLL 13 binarizes the wobble signal WB to generate a wobble clock WCK. The wobble clock WCK is input to a recording clock multiplying PLL and the wobble address decoder 15.

The wobble address decoder 15 decodes a wobble address WADR from wobble signal WB using the wobble clock WCK as a reference. The wobble address WADR is transmitted to a host apparatus. The wobble address WADR is then used as an address on the disk during information recording or reproduction. The wobble address decoder 15 detects, for example, the head of each wobble address and outputs a wobble phase reference pulse WPR.

FIG. 8 shows the waveforms of inputs to and outputs from the wobble address decoder 15. The wobble address decoder 15 compares the polarity of the wobble signal WB with the polarity of the wobble clock WCK. If the polarities are the same, the wobble address decoder 15 internally generates a wobble demodulation signal WBD at an "L" level. If the polarities are different from each other, the wobble address decoder 15 internally generates a wobble demodulation signal WBD at an "H" level. Accordingly, the wobble demodulation signal WBD is at the "H" level in the IPW portions. Thus, the wobble address block synchronous byte (a pattern of 6 IPWs, 4 NPWs, and 6 IPWs) is detected to generate a wobble phase reference pulse WPR.

The recording clock multiplying PLL 14 multiplies the frequency of the wobble clock WCK by, for example, 93 to generate a recording clock RCK corresponding to a channel frequency. In other words, the recording clock multiplying PLL 14 converts one wobble into 93 recording clocks RCK. The recording clock multiplying PLL 14 includes a VCO (Voltage Controlled Oscillator) 14a. The recording clock multiplying PLL 14 varies the frequency of the recording clock RCK in association with a difference in phase between the recording clock RCK and the wobble clock WCK. The recording clock multiplying PLL 14 then outputs a recording clock RCK the phase of which synchronizes with the phase of the wobble clock WCK.

On the basis of data input by the host apparatus, a data block stream generator 17 generates a data block stream DBS of predetermined amount. In this case, the channel frequency of the data block stream DBS is obtained using the recording clock RCK as a reference. Specifically, each data (binary signal) of the data block stream DBS is output by the recorded stream generator 17 using the period of the recording clock RCK. Further, the data block stream generator 17 detects the sectors or frames (see FIG. 5) in the data sent by the host apparatus. The recorded stream generator 17 then outputs data phase reference pulses DPR in synchronism with the recording clock RCK; the data phase reference pulses DPR are indicative of sector synchronous positions or frame synchronous positions. The data phase reference pulse DPR indicates the sector synchronous position (for example, the head position of each sector) or the frame synchronous position (for example, the head position of each frame).

The data block stream DBS is input to a switch 19. A VFO signal generated by a VFO pattern generator 18 is also input to the switch 19. The VFO signal is obtained by dividing the frequency of the recording clock RCK into, for example, four parts as previously described.

The wobble phase reference pulse WPR from the wobble address decoder 15 and the data phase reference pulse DPR from the data block stream generator 17 are input to a recording timing controller 16. The recording timing controller 16 measures a difference in phase between the signals WPR and DPR input. In FIG. 9, there is no difference in phase between the wobble phase reference pulse WPR and the data phase reference pulse DPR. The amount of difference in phase PDA is thus always 0. On the basis of the wobble phase reference pulse WPR, the data phase reference pulse DPR, and the amount of phase difference PDA, the recording timing controller 16 generates a data selection signal DS. The recording timing controller 16 provides the switch 19 with the data selection signal DS.

The switch 19 selectively outputs a VFO signal when the data selection signal DS is, for example, at the high level. The switch 19 selectively outputs a data block stream DBS when the data selection signal DS is, for example, at the low level. As a result, a data stream DST is generated. Laser light is modulated via an LD driver 20. Then, the laser light modulated is used to record the data stream DST on the disk. The switch 19 and the recording timing controller 16 constitute a VFO inserting section 21. Accordingly, the VFO inserting section 21 inserts, into a predetermined amount (32 sectors) of data block stream DBS, VFO signals each of a length of time corresponding to the difference in phase between the wobble address phase reference pulse WPR and the data phase reference pulse DPR. As a result, the VFO inserting section 21 provides a data stream DST consisting of the VFO signals and the data block stream DBS.

Description will be given of operations preformed if the recording clock RCK changes.

Figure 10:
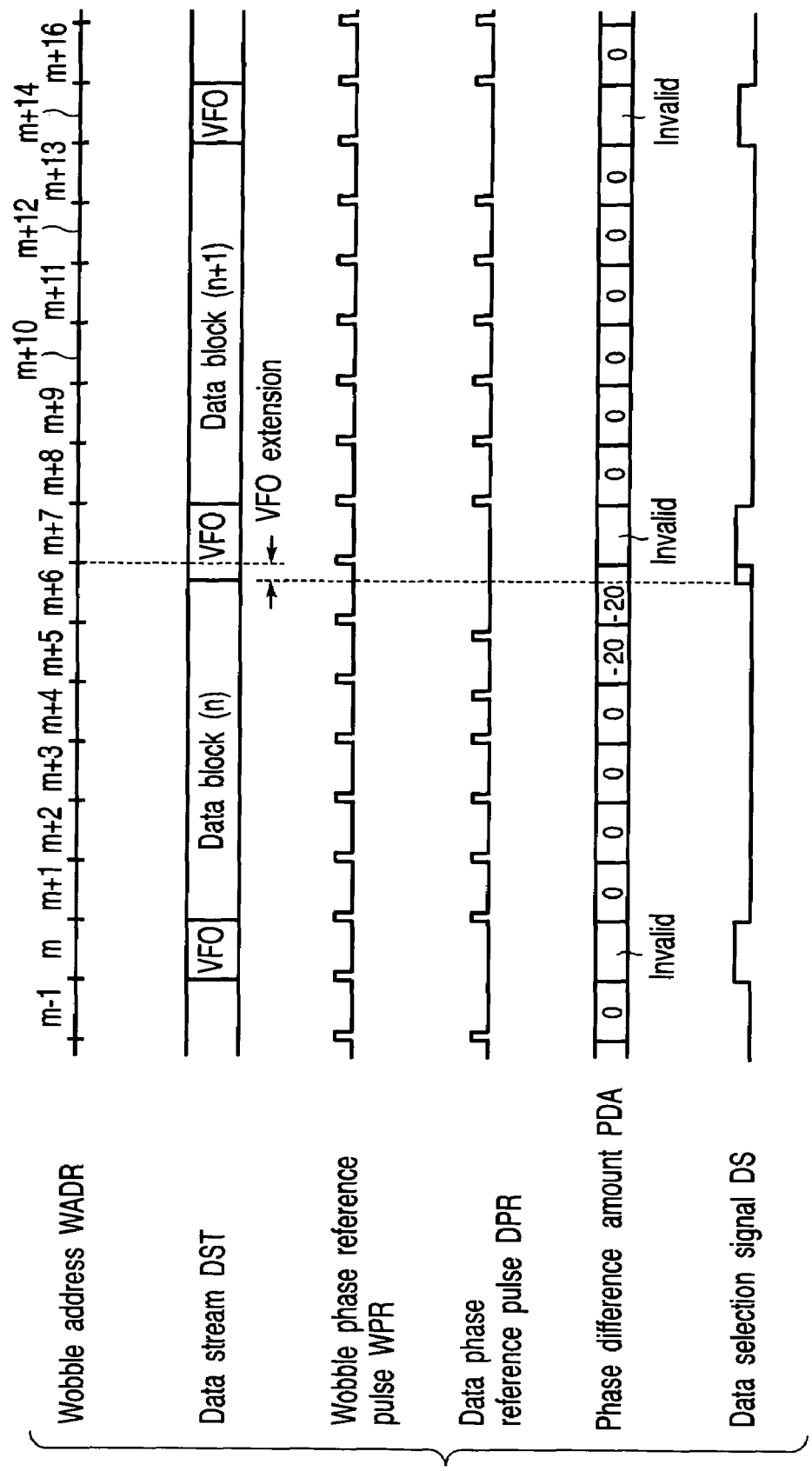
FIG. 10 is a diagram showing that when a data block (n) is generated, the frequency of a recording clock RCK temporarily increases for some reason.

FIG. 10 shows that when a data block (n) is generated, the frequency of the recording clock RCK temporarily increases for some reason. Desirably, the data terminal of the data block (n) intrinsically coincides with the terminal of the wobble address (m+6). However, in FIG. 10, the recording of the data block (n) ends prematurely.

For example, if a wobble formed during the manufacture of a disk is defective or the disk is damaged or stained during manufacture, a normal wobble signal WB is not obtained. In such a case, the wobble clock WCK from the wobble PLL 13 is instable. As a result, an input voltage to the VCO 14a of the recording clock multiplying PLL 14 is instable. This may change the frequency of the recording clock RCK. When the period of the recording clock RCK changes, the period of the data phase reference pulse DPR also changes. For example, a decrease in the period of the recording clock RCK reduces the period of the data phase reference pulse DPR.

Even if the waveform of the wobble signal is thus disturbed, the wobble phase reference pulse WPR is generally not disturbed as shown in FIG. 10. This is because a wobble phase reference pulse WPR is normally generated from the wobble track formed on the disk provided that the first 16 wobbles (6 IPWs, 4 NPWs, and 6 IPWs) of a wobble address block synchronous byte Sync (see FIG. 6) in the wobble address block 103 as well as wobbles preceding and succeeding these 16 wobbles are normally detected.

When the waveform of the wobble signal is disturbed to change the recording clock frequency, the phase of the data phase reference pulse DPR (sector synchronous position or frame synchronous position) shifts from the phase of the wobble phase reference pulse WPR. The recording timing controller 16 measures the amount of phase shift (phase difference). The recording timing controller 16 controls the switch 19 so that the corresponding VFO signal recorded area is extended in association with the phase difference. As a result, as shown in FIG. 10, a data block (n+1) starts to be recorded at the head of the wobble address (m+8). In FIG. 10, it is determined as a result of detection that in the data block (n), the phase is 40 recording clocks RCK faster. Accordingly, the VFO is extended by a length equal to 40 clocks.

Figure 11:
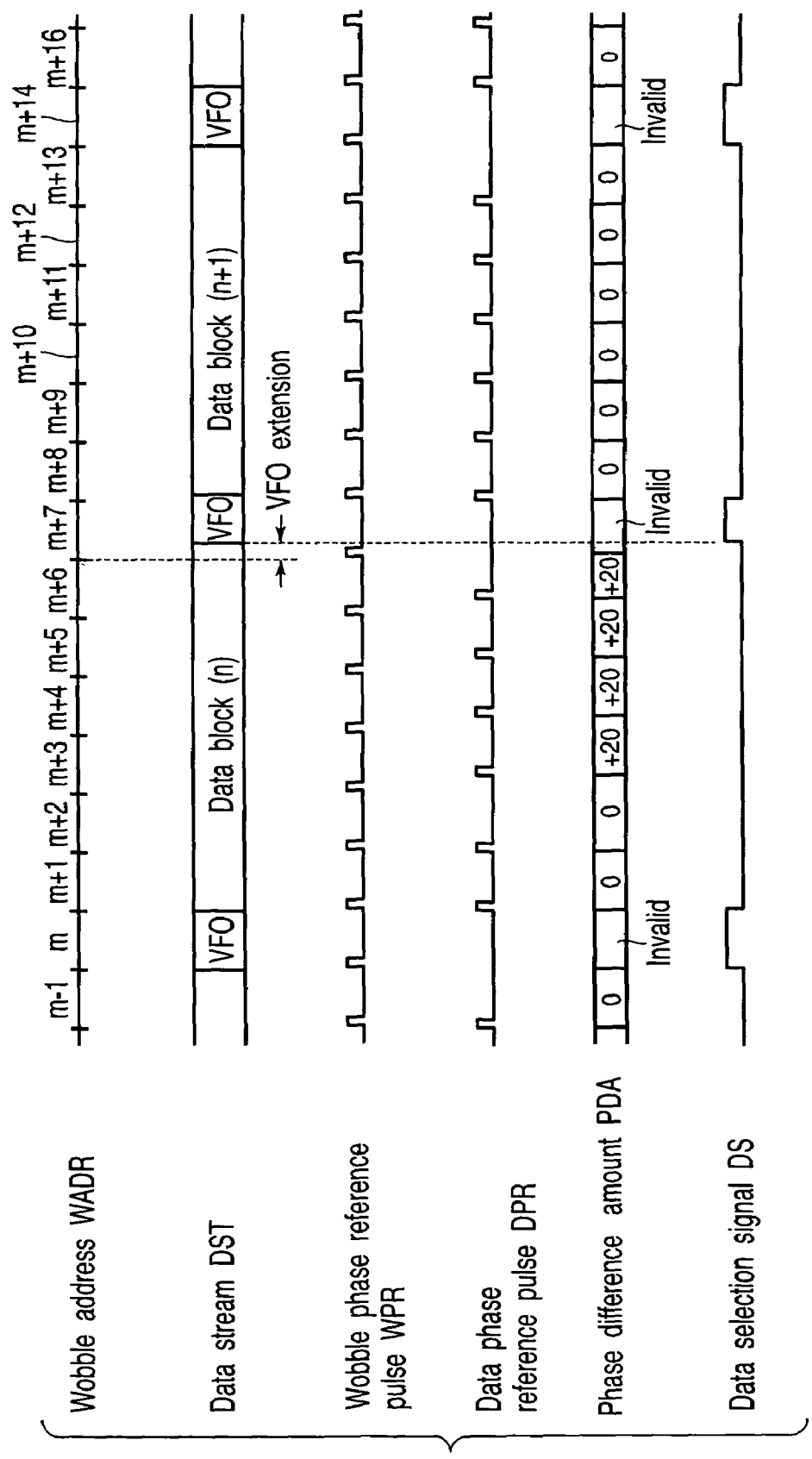
FIG. 11 is a diagram showing that when a data block (n) is generated, the frequency of the recording clock RCK temporarily decreases because of, for example, the disturbance of a wobble signal.

On the other hand, FIG. 11 is a diagram showing that when a data block (n) is generated, the frequency of the recording clock RCK temporarily decreases because of, for example, the disturbance of a wobble signal. Desirably, the data terminal of the data block (n) intrinsically coincides with the terminal of the wobble address (m+6). However, the recording of the data block (n) ends later than desired.

The recording timing controller 16 measures the amount of phase shift (phase difference). The recording timing controller 16 controls the switch 19 so that the corresponding VFO signal recorded area is shortened in association with the phase difference. As a result, the data block (n+1) starts to be recorded at the head of the wobble address (m+8). In FIG. 11, it is determined as a result of detection that in the data block (n), the phase is slower by 80 recording clock RCK. Accordingly, the VFO is shortened by a length equal to 80 clocks.

As described above, according to the present embodiment, even if the recording clock frequency varies to shift the position of the data to be recorded, the position can be corrected without any increase in the amount of recording clock jitter.

FIG. 12 is a diagram showing an example of the configuration of an essential part of an optical disk apparatus according to a second embodiment of the present invention.

In the second embodiment, the VFO inserting section 21 is composed of an OR circuit 22 and the recording timing controller 16. The VFO pattern generator 18 and the data block stream generator 17 are supplied with a data selection signal DS output by the recording timing controller 16. When the data selection signal DS is at, for example, the high level, the data block stream generator 17 outputs a data block stream DBS. When the data selection signal DS is at the low level, the VFO pattern generator 18 outputs a VFO signal. The OR circuit 22 outputs the logical OR of the data block stream DBS and VFO signal to the LD 20. In the present embodiment, the switch 19 is replaced with the OR circuit 22. This makes it possible to simplify the configuration of the circuit.

The above description relates to embodiments of the present invention and is not intended to limit the apparatus and method according to the present invention. Further, the present invention includes apparatuses and methods configured by appropriately combining any of the components, functions, features, or process steps of the embodiments.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical disk apparatus comprising:
   a wobble signal generating section which generates a wobble signal from reflected light from a track in an optical disk on which wobbles modulated by address information are formed;
   a recording clock generating section which multiplies a frequency of the wobble signal to generate a recording clock for information recording;
   an address phase generating section which generates an address phase signal indicative of a phase of each wobble address, from the wobble signal;
   a VFO (Variable Frequency Oscillator) signal generating section which generates a VFO signal in synchronism with the phase of the recording clock;
   a data stream generating section which generates a first data stream in synchronism with the phase of the recording clock, from input data and generates, for each predetermined data unit constituting the first data stream, a data phase signal indicative of a phase of the data unit;
   an inserting section which measures a difference in phase between the address phase signal and the data phase signal, and inserts the VFO signal between predetermined amount of the first data streams, to provide a second data stream consisting of the VFO signals and the first data streams, the VFO signal having a length of time corresponding to the difference in phase; and
   a recording section which records the second data stream on the optical disk.

2. The optical disk apparatus according to claim 1, wherein the first data stream generated by the recorded stream generating section is composed of a plurality of sectors, and the data phase signal is a sector synchronous signal indicative of a position of each sector.

3. The optical disk apparatus according to claim 1, wherein the first data stream generated by the recorded stream generating section is composed of a plurality of sectors, each sector is composed of a plurality of frames, and the data phase signal is a frame synchronous signal indicative of a position of each frame.

4. The optical disk apparatus according to claim 1, wherein the inserting section comprises a switching section which selects one of the first data stream and the VFO signal in accordance with the phase difference measured and which provides the second data stream.

5. The optical disk apparatus according to claim 1, wherein the inserting section comprises a recording timing controller which outputs a control signal based on the phase difference to the recorded stream generating section and the VFO signal generating section,
   a logical OR circuit which outputs a logical OR of the first data stream and the VFO signal.

6. A method for recording information in an optical disk apparatus which records information on an optical disk, the method comprising:
   generating a wobble signal from reflected light from a track in the optical disk on which wobbles modulated by address information are formed;
   multiplying a frequency of the wobble signal to generate a recording clock for information recording;
   generating an address phase signal indicative of a phase of each wobble address, from the wobble signal;
   generating a VFO signal in synchronism with the phase of the recording clock;
   generating a first data stream in synchronism with the phase of the recording clock, from input data;
   generating, for each predetermined data unit constituting the first data stream, a data phase signal indicative of a phase of the data unit;
   measuring a difference in phase between the address phase signal and the data phase signal;
   measuring a difference in phase between the address phase signal and the data phase signal;
   inserting the VFO signal between predetermined amount of the first data streams, to provide a second data stream consisting of the VFO signals and the first data streams, the VFO signal having a length of time corresponding to the difference in phase; and
   recording the second data stream on the optical disk.

7. A method according to claim 6, wherein the first data stream is composed of a plurality of sectors, and the data phase signal is a sector synchronous signal indicative of a position of each sector.

8. A method according to claim 6, wherein the first data stream is composed of a plurality of sectors, each sector is composed of a plurality of frames, and the data phase signal is a frame synchronous signal indicative of a position of each frame.

9. A method according to claim 6, wherein the inserting comprises selecting one of the first data stream and the VFO signal in accordance with the phase difference measured and providing the second data stream.

* * * * *